US008872839B2

(12) United States Patent
Clark et al.

(10) Patent No.: US 8,872,839 B2
(45) Date of Patent: Oct. 28, 2014

(54) REAL-TIME ATLASING OF GRAPHICS DATA (75) Inventors: Brendan J. Clark, Seattle, WA (US); Ashraf Michail, Redmond, WA (US); Bede Jordan, Seattle, WA (US); George Xin Gao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 496 days.

(21) Appl. No.: 13/229,405

(22) Filed: Sep. 9, 2011

(65) Prior Publication Data

US 2013/0063463 A1  Mar. 14, 2013

(51) Int. Cl.
G09G 5/00 (2006.01)

(52) U.S. Cl.
CPC .......................................... *G09G 5/00* (2013.01)
USPC ........................................... 345/582; 345/552

(58) Field of Classification Search
CPC ........ G06T 15/04; G06T 17/20; G06T 11/001
USPC ................................... 345/542, 543, 545, 582
See application file for complete search history.

(56) References Cited

U.S. PATENT DOCUMENTS 6,731,310 B2 * 5/2004 Craycroft et al. ............. 715/765
7,397,480 B2 * 7/2008 Spicer ........................... 345/582
7,889,205 B1 * 2/2011 Parenteau et al. ............. 345/545
2003/0117403 A1 6/2003 Park et al.
2006/0227131 A1 10/2006 Schiwietz et al.

OTHER PUBLICATIONS

Carr, Nathan A. Prelim: A New Surface Domain for GPU Processing. Diss. University of Illinois, 2004.*
McDermott, Wes, "Creating 3D Game Art for the iPhone with Unity", Focal Press, Oct. 12, 2010, pp. 76-78.*
Martinez Bayona, Jonas, "Space-Optimized Texture Atlases", Master Thesis, Universitat Politècnica De Catalunya Departament De Llenguatges I Sistemes Informatics Master in Computing, Sep. 8, 2009, 98 pages.
Verbeiren, et al.,"Optimizing 3D Applications for Platforms Based on Intel® Atom™ Processor", Published on: Mar. 2010, Available at: http://download.intel.com/embedded/processor/whitepaper/323644.pdf.

(Continued)

*Primary Examiner* — Hau Nguyen
*Assistant Examiner* — Ryan M Gray
(74) *Attorney, Agent, or Firm* — Tony Azure; Peter Taylor; Micky Minhas (57) ABSTRACT Performing real-time atlasing of graphics data and creation and maintenance of texture atlases for applications having dynamic graphics content. Embodiments include allocating a texture atlas configured to store textural elements for use in rendering graphical elements, and providing a graphics processing unit (GPU) access to the texture atlas. During subsequent execution of an application, when a graphical element of the application is to be rendered by the GPU, a block of space can be allocated within the texture atlas and a textural element corresponding to the graphical element can be stored within the allocated block. The GPU therefore has access to the textural element when rendering the graphical element.

23 Claims, 3 Drawing Sheets (56) References Cited

OTHER PUBLICATIONS

Martinez, et al., "Space-optimized Texture Atlases for 3D Scenes with Per-polygon Textures", In Proceedings of the 18th Pacific Conference on Computer Graphics and Applications, Sep. 25-27, 2010, pp. 14-23.

Wei, Li-Yi, "Tile-Based Texture Mapping on Graphics Hardware", In Proceedings of the ACM SIGGRAPH/Eurographics, Conference on Graphics Hardware 2004, 55-64.

Velho, et al., "Projective Texture Atlas and Applications", Retrieved on: Aug. 11, 2011, Available at: http://www.visgraf.impa.br/Data/RefBib/PS_PDF/avignon07-jonas/avignon06-velho.pdf.

Ferreira, Eddy, "Texture Atlasing, Mesh Simplification, and Progressive Meshes for a Virtual World Architecture", Published on: May 2, 2011, Available at: http://www.princeton.edu/~eferreir/report.pdf.

* cited by examiner

REAL-TIME ATLASING OF GRAPHICS DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Many computer systems now include computer hardware optimized for processing and rendering graphics information. For example, some computer systems include one or more graphics processing units (GPUs) optimized for parallel graphics processing tasks. As a result, many applications now leverage GPUs for rendering graphical content. Applications that render graphical content using GPUs typically represent graphical objects in a format consumable by the GPU, and pass these representations to the GPU for processing. For example, many "GPU-consumable" representations describe graphical objects in terms of polygons and textural elements applied to the polygons.

Applications commonly contain a plurality of graphical objects. Rendering these objects, particularly when there are a great number of objects, can be taxing on the GPU because it can be costly for the GPU to switch between different textures. As such, application developers make use of texture atlases, which package a plurality of textural elements into a single texture. Texture atlases are generated for an application during the development cycle of the application, and are then distributed with the application. For example, in the case of a game application, various textures used to render objects in the game are packaged into one or more texture atlases, and are then distributed with the game application. Some applications are limited to rendering only graphical objects which have corresponding textural information stored in a texture atlas.

Other applications may sometimes request to render graphical objects which do not have corresponding textural information included in shipped texture atlases. To render these graphical objects, GPU-consumable representations, including textural information, are generated and passed to the GPU. The GPU then renders these objects with the generated textural information, which is not contained in any shipped texture atlas. As such, these graphical objects cause context switches at the GPU, leading to potentially significant performance penalties. If an application has a substantial number of graphical objects that do not have corresponding textural data in a texture atlas, rendering these graphical objects may lead to a reduced user experience, particularly if the computer system executing the application has limited resources.

BRIEF SUMMARY

Embodiments may include functionality for performing real-time atlasing of graphics data. Embodiments may enable rendering of dynamic graphics content with one or more graphics processing units (GPUs), while at the same time reducing the number of context switches performed by the GPU(s) when rendering the content.

In one embodiment, for example, a method for atlasing graphics data of an application can include allocating memory for a texture atlas for storing textural elements of arbitrary size for use in rendering graphical elements. The method can also include providing a GPU access to the allocated texture atlas. Subsequently, during execution of an application, it can be determined that a graphical element of the application is to be rendered by the GPU. In response, a block of space can be allocated within the texture atlas for storing a textural element that is usable by the GPU when rendering the graphical element for the application. Then, the textural element can be stored in the allocated block of space so that the GPU has access to the textural element when rendering the graphical element for the application.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Some embodiments described herein extend to performing real-time atlasing of graphics data. Embodiments may enable rendering of dynamic graphics content with one or more graphics processing units (GPUs), while at the same time reducing the number of context switches performed by the GPU(s) when rendering the content.

In one embodiment, for example, a method for atlasing graphics data of an application can include allocating memory for a texture atlas for storing textural elements of arbitrary size for use in rendering graphical elements. The method can also include providing a GPU access to the allocated texture atlas. Subsequently, during execution of an application, it can be determined that a graphical element of the application is to be rendered by the GPU. In response, a block of space can be allocated within the texture atlas for storing a textural element that is usable by the GPU when rendering the graphical element for the application. Then, the textural element can be stored in the allocated block of space so that the GPU has access to the textural element when rendering the graphical element for the application.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, "netbook" computers, tablet computers, message processors, hand-held devices, multi-processor systems, microprocessor-based or programmable consumer electronics, network PCs, minicomputers, mainframe computers, mobile telephones, PDAs, media devices, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present invention may comprise computer systems optimized for processing and rendering graphics information. As such, embodiments of the invention may include computer systems having one or more GPUs that process and render graphics information to build a scene in a frame buffer for display on a display device.

Some embodiments enable efficient rendering of dynamic graphical content by performing real-time atlasing of textural information. As such, a computer system rendering an application having dynamic graphical content (i.e., graphical objects not known during development of the application) can receive the benefit of texture atlasing and the accompanying reduced context switches at the GPU.

For example, the content displayed by user interfaces can vary depending on the applications being executed, the input to the applications, user input, etc. As such, user interfaces can be updated over time as elements are added, removed, or change size. Rendering dynamic graphical content, such as user interfaces, would typically involve dynamically generating textural information for the displayed graphical objects and passing this information to a GPU on an object-by object basis. Applications that generate dynamic graphical content would therefore not typically benefit substantially from texture atlases. While the performance penalties associated with such applications may be manageable on powerful computing systems, these penalties may limit the ability of developers to produce rich graphical experiences on less powerful computer systems, such as portable computing devices (e.g., smart phones, PDAs, portable media players, tablet computers, netbook computers, and the like) which can have limited processing, memory, and power resources. Real-time atlasing addresses some of the performance issues associated with rendering dynamic graphical content, and helps alleviate challenges associated with rendering such content on less powerful computer systems.

Figure 1:
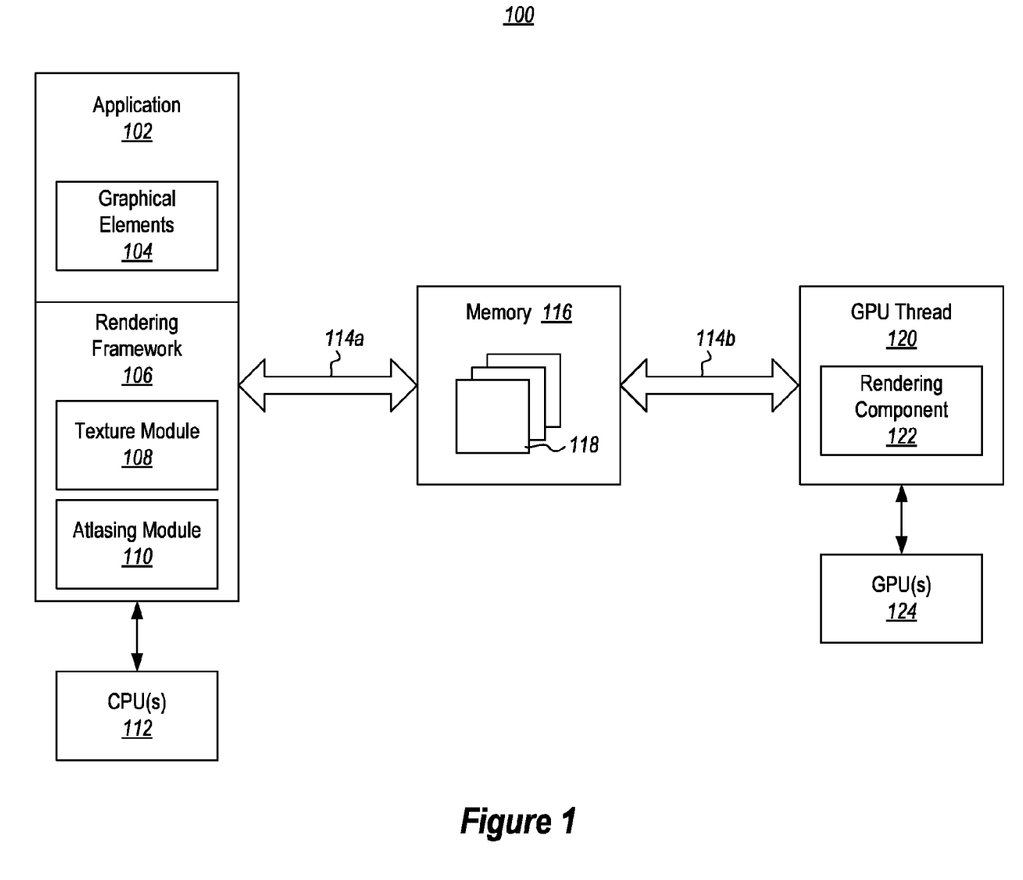
FIG. 1 illustrates an example computer architecture that facilitates real-time atlasing of graphics data.

FIG. 1, for example, illustrates an example computer architecture 100 that facilitates real-time atlasing of graphics data. Referring to FIG. 1, computer architecture 100 includes an application 102 (or multiple applications), a rendering framework 106, and a GPU thread (or process) 120. As shown, the application 102 and the rendering framework 106 can be configured to execute primarily on (or with use of) one or more CPU(s) 112, which can comprise one or more general-purpose and/or special-purpose processors. In addition, the GPU thread 120 can be configured to execute primarily on (or with use of) one or more GPU(s) 124. It will be appreciated that the application 102 and/or the rendering framework 106 can, in some embodiments, also be configured to make direct use of the GPU(s) 124. Similarly, in some embodiments, the GPU thread 120 can be configured to execute primarily on the CPU(s) 112 and utilize the GPU(s) 124 for some processing tasks.

As shown, the application 102 and/or rendering framework 106 are configured to access a memory 116 through a communications channel 114a. Similarly, the GPU thread 120 is configured to access to the memory 116 through a communications channel 114b, which can be the same communications channel as communications channel 114a, or a different communications channel. The type of communications channel(s) used can vary widely depending on the particular configuration of computer architecture. The memory 116 can be configured to store one or more dynamically-generated texture atlases 118, making the texture atlases 118 available to the GPU thread 120 while concurrently being modified/generated by the application 102 and/or the rendering framework 106.

The application 102 comprises an application executing at a computer system. For instance, application 102 may comprise an operating system (or an operating-system level program) or an end-user program. While shown as a single unit, the application 102 can comprise a plurality of components or modules, such as programs, threads, processes, etc. As shown, the application 102 includes graphical elements 104 for display on a display device. In some embodiments, the graphical elements 104 can comprise graphical elements of a user interface generated by the application 102, such as user interface widgets. However, the graphical elements 104 can comprise any graphical information related to the application 102, such as content displayed by the application 102 (e.g., text, images, video media, vector graphics), whether the content is displayed in connection with a user interface or not. As such, the graphical elements 104 can comprise many different types of graphical content in the form of user interface elements (widgets), media, text, gaming content, models, etc.

The application 102 makes use of (or directly contains) the rendering framework 106, which renders the graphical elements 104 while leveraging the GPU thread 120. The rendering framework 106 can, itself, comprise multiple applications, threads or processes, such as one or more user interface or application threads, one or more composition or render threads, etc. The rendering framework 106 is configured to convert the graphical elements 104 of the application 102 to a format consumable by the GPU thread 120, and to send these graphical elements to the GPU thread 120 for further processing and rendering.

As shown, the rendering framework 106 includes a texture module 108 and an atlasing module 110. The texture module 108 is configured to generate appropriate textural elements for any graphical elements 104 that are to be rendered at the GPU thread 120. In some embodiments, the texture module 108 generates textural elements if a graphical element needs textural information for rendering, and if appropriate textural elements do not already exist in any texture atlas. At times, for instance, appropriate textural elements may already exist in a texture atlas generated during application development and shipped with the application 102, or in a texture atlas generated in real-time that already contains a textural element generated for a different graphical element, but which is usable for a current graphical element. When it is appropriate to generate textural elements for a graphical element the texture module 108 may generate one or more textural elements for the graphical element, including mask data that defines the shape of the graphical element (e.g., an alpha mask), and/or brush data defining the fill content of the graphical element (texture bitmaps, gradients, solid fills, etc.). In some embodiments, the application 102 may provide textural elements itself, alleviating the need for texture module 108 to generate them.

The atlasing module 110 is configured to dynamically create and manage one or more texture atlases 118 in real-time, during execution of the application 102 which is causing textural elements to be added to the texture atlases 118. As such, the atlasing module 110 is configured to allocate space in memory 116 for the texture atlases 118, making them available to the GPU thread 120 for use in rendering graphical elements contained therein. The atlasing module 110 is also configured to store textural elements (e.g., mask data and brush data) generated by texture module 108 or received from the application 102 in the texture atlases 118 and to otherwise manage the texture atlases 118. As such, the atlasing module 110 is configured to add and remove textural elements over time, to re-use space as elements are removed, to re-pack existing allocations within each texture atlas in order to optimize space utilization, etc. Each texture atlas may be conceptually viewed as a block of memory representing a two-dimensional grid that can store two-dimensional objects of arbitrary size and having varying dimensions.

The GPU thread 120 is configured to receive GPU instructions and/or data (not shown) from the rendering framework 106, which instruct the GPU thread 120 to render graphical elements while leveraging textural elements stored in the texture atlases 118, to generate a scene in a frame buffer (not shown). As shown, the GPU thread 120 includes a rendering component 122 for performing the rendering. The rendering component 122 can contain a plurality of sub-components (e.g., shaders) for rendering graphical content, and is configured to access one or more textural elements from each texture atlas 118 to which it has access, when appropriate. In some embodiments, the rendering component 122 leverages (u,v) coordinates contained in the GPU instructions/data to identify the location of each textural element in a given texture atlas.

Returning to the atlasing module 110, the atlasing module 110 may be configured to perform one or more of several different techniques for partitioning each texture atlas 118 and for storing textural elements within each texture atlas 118. The atlasing module 110 can also perform several optimizations on these techniques. For example, the atlasing module 110 can employ a real-time spatial allocation technique that uses immediate allocation of space for a current textural element and delayed partitioning of the remaining unallocated space. Using the spatial allocation technique, storing a textural element within a texture structure involves (i) allocating a portion of space in a corner of the texture structure (e.g., a top-left corner) where the textural element is stored, and (ii) delaying partitioning of the unallocated space surrounding the allocated portion until a subsequent textural element is stored. In one embodiment, the unallocated space may be later partitioned into two other texture structures along one of two lines extending perpendicularly from a corner of the allocated portion that is surrounded by the unallocated space. The spatial allocation technique can be applied recursively, such that when the unallocated space is partitioned, the new partitions are seen as "new" texture structures which are potentially partitioned according the same spatial allocation technique.

Figure 2A:
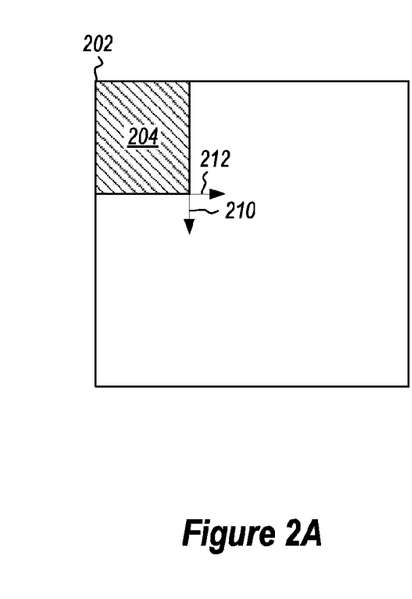
FIGS. 2A-2C illustrates an example texture atlas, partitioned in real-time according to a spatial allocator with delayed partitioning.
Figure 2B:
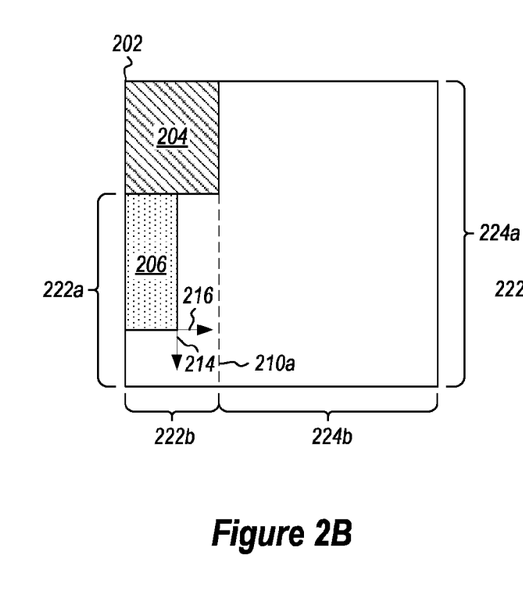
Figure 2C:
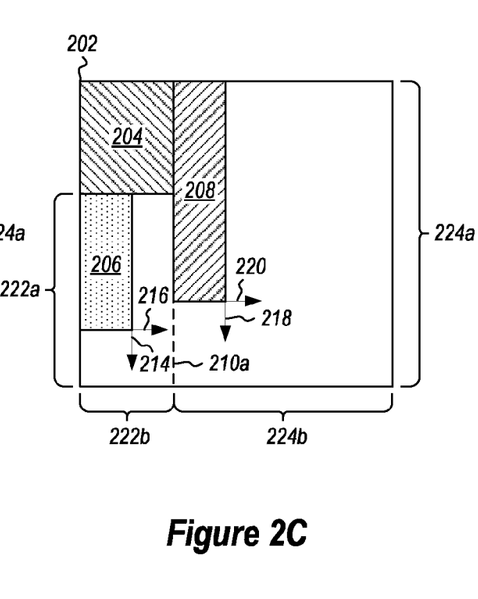

FIGS. 2A-2C illustrate an exemplary application of the real-time spatial allocation technique briefly described above. For instance, FIG. 2A illustrates a texture structure 202 into which a first textural element 204 has been stored by the atlasing module 110. The texture structure 202 can represent a complete texture atlas 118, or a portion of a texture atlas 118. Prior to storing the first textural element 204 in the texture structure 202, the atlasing module 110 views the texture structure 202 as one large block of space, or a single partition. Thus, when storing the first textural element 204 in the texture structure 202, the atlasing module 110 (i) allocates space in a corner of the structure (i.e., the top-left corner, in this case) where the first textural element 204 is stored, and (ii) delays further partitioning of the unallocated space surrounding the first textural element 204 (i.e., the space to the right of and below the first textural element 204) until a subsequent textural element is stored. As illustrated, the space surrounding the stored textural element 204 is potentially partitioned along either arrow 210 or arrow 212, which extend perpendicularly from a corner of the allocated space that is surrounded by the unallocated space. When the atlasing module 110 later fixes the partitioning of the unallocated space along either arrow 210 or arrow 212 (when storing a subsequent textural element), the resulting partitions are viewed as new subsidiary texture structures to which the spatial allocation technique can be applied recursively.

FIG. 2B illustrates an embodiment in which the atlasing module 110 has subsequently stored a second textural element 206 in the texture structure 202. As shown, the atlasing module 110 chose to fix the partitioning of the unallocated space along arrow 210 (as indicated by the dashed line 210a), because the second textural element 206 would be too tall to fit in the space above arrow 212 if the partitioning was fixed along arrow 212. Thus, the area designated by the brackets 222a and 222b (i.e., the area below the first textural element 204 and to the left of the dashed line 210a) is viewed as a first new texture structure. Similarly, the area designated by the brackets 224a and 224b (i.e., the area the right of the first textural element 204 and to the right of the dashed line 210a) is viewed as a second new texture structure. Applying the spatial allocation technique recursively, the atlasing module 110 splits first new texture structure (designated by brackets 222a and 222b) by (i) allocating space in a corner of the structure where the second textural element 206 is stored, and (ii) delaying further partitioning of the unallocated space surrounding the second textural element 206 until a subsequent textural element is stored. As illustrated, the un-partitioned space surrounding the second textural element 206 may potentially partitioned along either arrow 214 or arrow 216, which extend perpendicularly from the corner of the allocated portion surrounded by the unallocated space.

In FIG. 2C, a third textural element 208 has been stored in the texture structure 202 by the atlasing module 110. Here, the atlasing module 110 choose from among three areas of unallocated space: (i) the second new texture structure (designated by brackets 224a and 224b) or (ii and iii) one of the potential new texture structures that could be created in the unallocated space surrounding the second textural element 206. As illustrated, given the height of the third textural element 208, the atlasing module 110 chooses to store the third textural element 208 in the second new texture structure (designated by brackets 224a and 224b). As such, applying the spatial allocation technique recursively, the atlasing module 110 (i) allocated space in a corner of the second new texture structure and stored the third textural element 208 in the allocated space, and (ii) delayed further partitioning of the unallocated space surrounding the third textural element 208 until a subsequent textural element is stored. As illustrated, the un-partitioned space surrounding the third textural element 208 may potentially be partitioned along either arrow 218 or arrow 220, which extend perpendicularly from the corner of the allocated portion surrounded by the unallocated space.

While not illustrated, the spatial allocation technique also supports the removal of textural elements from texture atlases/structures. As such, when textural elements are removed, corresponding space allocated for storing these elements can potentially be freed. For instance, if the second textural element 206 is removed from the texture structure 202, the allocated portion in which the element is stored may be unallocated.

While the spatial allocation technique is shown as always storing new textural elements in the top-left corner of a structure, it will be appreciated that the textural elements can be stored in any corner and that, in some embodiments, the corner chosen may vary within the same texture atlas. Furthermore, while subsequent partitioning is illustrated as being fixed along only one arrow, both arrows may be used. For instance, the second new texture structure (designated by brackets 224a and 224b) is shown as being fixed only according to arrow 210. In some embodiments, however, the second new texture structure may be sub-partitioned according to arrow 212 as well. Also, while FIGS. 2A-2C illustrate unallocated space surrounding both sides of a stored textural element, it will be appreciated that the stored textural element may fill one or both dimensions of available unallocated space, such that allocating space for a textural element allocates the entirety of one or both of the dimensions of a structure.

As mentioned, the atlasing module 110 may employ several optimizations when storing textures according to the real-time spatial allocation technique. These optimizations can enable real-time atlasing to make better use of available memory, and help the real-time atlasing operate more quickly.

One optimization is to consider various rotations of the textural elements. Thus, when the atlasing module 110 is placing a textural element into a texture structure, the atlasing module 110 can consider whether the textural element would fit within an available block of space if rotated 90 degrees. By doing so, the spatial allocation technique may be able to pack textural elements more tightly, and may be able to perform fewer partitioning operations. Another optimization, which is particularly useful when storing textural elements for user interface elements, is for the atlasing module 110 to reserve an area of a texture atlas for commonly-sized textures used when rendering user interface elements. For instance, user interfaces frequently make use of solid fills and gradients. These textures can be stored in an optimized manner, such as a single pixel (e.g., for solid fills), or a one-pixel high row (e.g., for gradients). By reserving a portion of a texture atlas for storing these textural elements, the elements can be stored in the atlas without further partitioning of the atlas. Yet another optimization is for the atlasing module 110 to apply variable padding around textural elements, helping to support different filtering modes on the GPU 124 (e.g., bilinear filtering).

As mentioned, the real-time spatial allocation technique also supports removal of textural elements. In connection with removal, the atlasing module 110 can employ several optimizations to reuse space in texture structures as space is freed. For example, portions of a structure may "collapse down" when component parts are empty. Continuing the example given above of removing the second textural element 206, each component portion (i.e., the allocated portion and the areas surrounding the allocated portion) are free when the element is removed, so the entire structure designated by brackets 222a and 222b can be "collapsed down" and made available for re-allocation and re-partitioning. Furthermore, if a textural element is removed, the space allocated for that element may be reused if there are surrounding allocations that cannot be collapsed. In addition, when a texture atlas contains structures that are empty or mostly empty, multiple structures can be collapsed into a single structure.

Furthermore, the atlasing module 110 can involve completely re-working a texture atlas at defined intervals, or when utilization has crossed a defined threshold, to keep the overall utilization of an atlas within an acceptable threshold. For instance, when creating texture atlases, the atlasing module 110 can create atlases that are only as large as necessary (e.g., smaller atlases for smaller allocations, larger atlases for larger allocations). Then, the atlasing module 110 can detect when atlases have low utilization due to content removal and repack them into another atlas. Alternatively, the atlasing module 110 can detect when atlases have high utilization due to content addition and copy them into larger atlases (e.g., by combining them with other atlases).

As an additional optimization, the atlasing module 110 can track utilization of the texture atlases 118 in one or more separate data structures (e.g., in one or more tree structures) so that one or more portions of the texture atlases can be skipped when searching for free space. If a tree structure is used, it can be collapsed efficiently during removal of textural elements from the texture atlases by walking upwards from the removed element instead of re-searching the tree.

Figure 3:
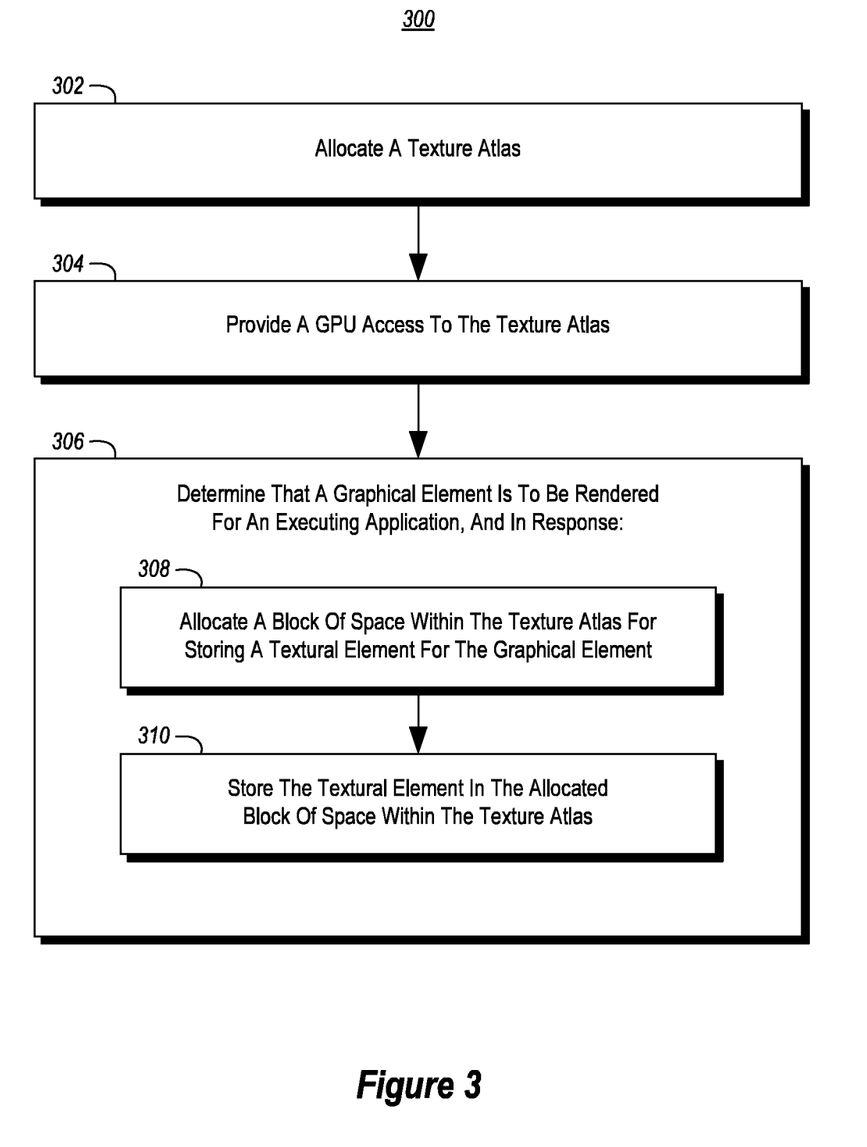
FIG. 3 illustrates a flow chart of an example method for atlasing graphics data of an application for rendering with a graphics process unit.

FIG. 3 illustrates a flow chart of an example method 300 for atlasing graphics data of an application for rendering with a GPU. Method 300 will be described with respect to the components and data of computer architecture 100.

Method 300 includes an act of allocating a texture atlas (act 302). Act 302 comprises allocating a texture atlas configured to store a plurality of textural elements of arbitrary size for use in rendering one or more graphical elements. For example, the atlasing module 110 can allocate space for a texture atlas 118 within memory 116. The atlasing module 110 can allocate the texture atlas 118 at any appropriate time, such as when the application 102 begins execution, when the rendering framework 106 is instantiated, when the application 104 requests that the rendering framework 106 render a graphical element 104, when the atlasing module 110 detects that other texture atlases 118 are full, etc.

Method 300 also includes an act of providing a GPU access to the texture atlas (act 304). For example, the GPU Thread 120 can gain access to the allocated texture atlas 118 via communications channel 114b to memory 116. In addition, the atlasing module or another component of the rendering framework 106 may notify the GPU thread 120 that the allocated texture atlas 118 is available and/or authorize the GPU thread 120 to access the allocated texture atlas 118.

In addition, method 300 includes an act of determining that a graphical element is to be rendered for an executing application (act 306). Act 306 comprises, subsequent to providing the GPU access to the texture atlas and during execution of an application, determining that a particular graphical element of the application is to be rendered by the GPU. For example, after making the allocated texture atlas 118 available to the GPU thread 120, the application 102 can request that the rendering framework 106 render one of the graphical elements 104. In response, the rendering framework can obtain or generate (with texture module 108) one or more textural elements for the graphical element.

Act 306 includes an act of allocating a block of space within the texture atlas for storing a textural element for the graphical element (act 308). Act 308 comprises allocating a block of space within the texture atlas for storing a particular textural element, the particular textural element usable by the GPU when rendering the particular graphical element for the application. For example, the atlasing module 110 can allocate space to store one of the textural element(s) obtained or generated for the graphical element in the allocated texture atlas 118. In one embodiment, the atlasing module 110 can perform a real-time spatial allocation technique with delayed partitioning. As such, the atlasing module 110 can allocate space for the textural element in a corner of a texture structure within the allocated texture atlas 118, leaving unallocated space surrounding the allocated space (e.g., as in FIG. 2A) for further partitioning.

Act 306 also includes an act of storing the textural element in the allocated block of space within the texture atlas (act 310). Act 310 comprises storing the particular textural element in the allocated block of space within the texture atlas, such that the GPU has access to the particular textural element when rendering the particular graphical element for the application. For example, after allocating space for the textural element in the allocated texture atlas 118, the atlasing module 110 can store the textural element within the allocated space. When using the real-time spatial allocation technique with delayed partitioning, the atlasing module 110 can forgo further partitioning until an additional textural element is added to the allocated texture atlas 118. When the additional textural element is added, the atlasing module 110 can further partition the texture as shown in FIG. 2B.

While not illustrated, the method 300 can also include acts of determining that the particular textural element is no longer needed, and as a result, freeing the allocated block of free space previously allocated for the particular textural element so that the block of space is now unallocated and available for storing one or more other textural elements. For example, the atlasing module 110 can determine that the textural element is no longer needed and remove the textural element from the allocated texture atlas and/or un-allocate the space that was allocated for the textural element. In addition, the atlasing module 110 can perform several optimizations, such as reusing the allocated block for a different textural element, collapsing a texture structure, combining texture structures, etc.

Also not illustrated, the method 300 can also include acts of reconfiguring the allocated texture atlas. For example, the atlasing module 110 can rearrange textural elements within the allocated texture atlas 118 to optimize the availability of contiguous blocks of unallocated space, allocate a new texture atlas and copy textural elements to the new texture atlas, etc. Utilizing new texture atlases can be useful to reduce the allocated size of a texture atlas when the number of textural elements decreases (i.e., by copying the textural elements to the new, smaller, atlas and by removing the original atlas), to increase the allocated size of the texture atlas when the number of textural element have increased (i.e., by copying the textural elements to the new, larger, atlas and by removing the original atlas), or to combine and/or consolidate multiple atlases.

Accordingly, embodiments may extend to real-time atlasing of graphics data, enabling the creation and maintenance of texture atlases for applications having dynamic graphics content. As such, some embodiments described herein can bring the benefits of texture atlasing to applications not normally suited for leveraging texture atlases.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including a graphics processing unit (GPU), a method for atlasing graphics data of an application for rendering with the GPU, the method comprising:
    an act of allocating a texture atlas configured to store a plurality of textural elements of arbitrary size for use in rendering one or more graphical elements;
    an act of providing the GPU access to the texture atlas;
    subsequent to providing the GPU access to the texture atlas and during execution of an application, an act of determining that a particular graphical element of the application is to be rendered by the GPU, and in response:
        an act of allocating a block of space within the texture atlas for storing a particular textural element, the particular textural element usable by the GPU when rendering the particular graphical element for the application; and
        an act of storing the particular textural element in the allocated block of space within the texture atlas, such that the GPU has access to the particular textural element when rendering the particular graphical element for the application; and
    an act of creating a new texture atlas in response to determining that the texture atlas is being underutilized.

2. The method as recited in claim 1, wherein the particular textural element comprises at least two dimensions, and wherein the act of allocating a block of space within the texture atlas for storing a particular textural element comprises:
    an act of identifying an unallocated block of space within the texture atlas, the unallocated block of space also comprising at least two dimensions;
    an act of determining that the particular textural element will not fit within the unallocated block of space in a current orientation;
    an act of determining that the particular textural element would fit within the unallocated block of space when the particular textural element is rotated, such that the two dimensions of the particular textural element fit within the two dimensions of the unallocated block of space; and
    rotating and storing the particular textural element in the texture atlas.

3. The method as recited in claim 1, further comprising:
    an act of determining that the particular textural element is no longer needed; and
    an act of freeing the allocated block of space previously allocated for the particular textural element so that the block of space previously allocated for the particular textural element is now unallocated and available for storing one or more other textural elements.

4. The method as recited in claim 3, further comprising:
    an act of allocating at least a portion of the unallocated block of space for use in storing at least one other textural element.

5. The method as recited in claim 4, wherein the act of allocating at least a portion of the unallocated block of space for use in storing at least one other textural element comprises partitioning the unallocated block of space into at least two texture structures.

6. The method as recited in claim 1, wherein the particular textural element comprises one or more of:
    mask data defining a shape of the particular graphical element, or
    brush data defining fill content of the particular graphical element.

7. The method as recited in claim 6, wherein the brush data includes one or more of a texture, an image, a gradient, text, or a fill color corresponding to the fill content of the particular graphical element.

8. The method as recited in claim 1, wherein the one or more graphical elements correspond to one or more graphical elements of a graphical user interface (GUI) of the application.

9. The method as recited in claim 8, further comprising:
    an act of reserving one or more portions of the texture atlas for use when allocating blocks of space for storing textural elements corresponding to commonly-sized GUI graphical elements.

10. The method as recited in claim 1, further comprising:
    an act of determining that the texture atlas should be reconfigured; and
    an act of re-arranging a plurality of textural elements within the texture atlas to optimize the availability of contiguous blocks of unallocated space within the texture atlas.

11. The method as recited in claim 10, wherein the act of determining that the texture atlas should be reconfigured comprises one or more of:
    an act of determining that overall utilization of the texture atlas has exceeded a defined threshold, or
    an act of determining that a defined amount of time has elapsed since a prior reconfiguration.

12. The method as recited in claim 1, wherein the texture atlas is a first texture atlas, the method further comprising:
    an act of determining that overall utilization of the first texture atlas is below a defined threshold; and
    in response, creating the new texture atlas by performing one or more of:
        an act of allocating a second texture atlas that is smaller than the first texture atlas, and copying one or more textural elements from the first texture atlas to the second texture atlas; or
        an act of combining the first texture atlas with one or more other texture atlases into a third texture atlas.

13. The method as recited in claim 1, wherein the texture atlas is a first texture atlas, the method further comprising:
    an act of determining that overall utilization of the first texture atlas is above a defined threshold; and
    in response, one or more of:
        an act of allocating a second texture atlas that is larger than the first texture atlas, and copying one or more textural elements from the first texture atlas to the second texture atlas; or an act of allocating a third texture atlas and adding any new textural elements to the third texture atlas.

14. The method as recited in claim 1, further comprising:
an act of maintaining a separate data structure that tracks utilization of space within the texture atlas, the separate data structure enabling faster searching for blocks of unallocated space within the texture atlas than would be possible when searching the texture atlas directly.

15. The method recited in claim 1, wherein the method further includes partitioning a block of unallocated space within the texture atlas which remains after storing the particular textural element for a new textural element to be stored in the texture atlas, said partitioning including:
forming a horizontal partition in the texture atlas along an edge of the particular textural element when it is determined the new textural element will fit within a vertical space to a side of the particular textural element that is defined by the horizontal partition; or
forming a vertical partition in the textural atlas along a vertical side edge of the particular textural element when it is determined the new textural element will not fit within the vertical space to the side of the particular textural element that is defined by the horizontal partition.

16. The method as recited in claim 12, wherein the method includes creating the new texture atlas by allocating the second texture atlas that is smaller than the first texture atlas, and copying the one or more textural elements from the first texture atlas to the second texture atlas.

17. The method recited in claim 12, wherein the method includes creating the new texture atlas by combining the first texture atlas with one or more other texture atlases into a third texture atlas.

18. A computer program product for use at a computer system that includes a graphics processing unit (GPU), the computer program product for implementing a method for atlasing graphics data of an application for rendering with the GPU, the computer program product comprising one or more computer storage media having stored thereon computer-executable instructions that, when executed at a processor, cause the computer system to perform the method, including the following:
reserve memory for a texture atlas configured to store a plurality of textural elements of arbitrary size for use in rendering one or more graphical elements, the memory for the texture atlas accessible to a GPU for rendering graphical data;
during execution of an application and subsequent to reserving memory accessible to the GPU for the texture atlas, determine that a particular graphical element of the application is to be rendered by the GPU, and in response:
partition a block of unallocated space within the texture atlas for storing a particular textural element corresponding the particular graphical element, the particular textural element usable by the GPU when rendering the particular graphical element; and
store the particular textural element within at least a portion of the partitioned block of space, such that the GPU has access to the particular textural element when rendering the particular graphical element for the application;
an act of determining that the texture atlas is being underutilized; and
an act of creating a new texture atlas in response to determining that the texture atlas is being underutilized.

19. The computer program product as recited in claim 15, wherein partitioning a block of unallocated space within the texture atlas for storing the particular textural element comprises:
identifying a rectangular block of un-partitioned space within the texture atlas that exceeds a rectangular size of the particular textural element in both width and height; and
partitioning a rectangular block of sufficient size in both width and height to store the particular textural element from a corner of the rectangular block of un-partitioned space, such that un-partitioned space surrounds the portioned rectangular block on two sides.

20. The computer program product as recited in claim 16, the method further comprising:
determining that another textural element is to be stored in the texture atlas;
determining that the other textural element would fit within one or more portions of the un-partitioned space surrounding the partitioned rectangular block; and
further partitioning the un-partitioned space surrounding the partitioned rectangular block for storing the other textural element.

21. The computer program product as recited in claim 17, the method further comprising:
determining that the other textural element has been removed from the texture atlas; and
in response, un-partitioning the space surrounding the partitioned rectangular block.

22. The computer program product as recited in claim 17, the method further comprising:
determining that the particular textural element has also been removed from the texture atlas; and
in response, un-partitioning the rectangular block of sufficient size so that the entire rectangular block of space is un-partitioned again.

23. A computer system, comprising:
one or more processors;
one or more graphics processing units (GPUs); and
one or more computer storage devices storing computer-executable instructions that, when executed, cause the one or more processors to carry out acts in a method for atlasing graphics data of an application for rendering with the GPUs, including the following:
an act of allocating a texture atlas configured to store a plurality of textural elements of arbitrary size for use in rendering one or more graphical elements;
an act of providing at least one of the GPUs access to the texture atlas;
subsequent to providing the at least one GPU access to the texture atlas and during execution of an application, an act of determining that a particular graphical element of the application is to be rendered by the at least one GPU, and in response:
an act of allocating a block of space within the texture atlas for storing a particular textural element, the particular textural element usable by the at least one GPU when rendering the particular graphical element for the application;
an act of storing the particular textural element in the allocated block of space within the texture atlas, such that the at least one GPU has access to the particular textural element when rendering the particular graphical element for the application; and
an act of subsequently removing the particular textural element from the texture atlas by at least freeing the block of space within the texture atlas, making the block of space available for storing one or more other textural elements;

an act of determining that overall utilization of the texture atlas is below a defined threshold after the particular textural element has been removed from the texture atlas; and an act of creating a new texture atlas that includes one or more textural elements from the texture atlas.

* * * * *